(12) United States Patent
Watanabe et al.

(10) Patent No.: US 12,473,973 B2
(45) Date of Patent: Nov. 18, 2025

(54) SHIFT DEVICE

(71) Applicant: KABUSHIKI KAISHA TOKAI-RIKA-DENKI-SEISAKUSHO, Aichi-ken (JP)

(72) Inventors: Hironori Watanabe, Aichi (JP); Syuji Nakamura, Aichi (JP); Kazuhiro Saito, Aichi (JP); Masao Ando, Aichi (JP); Haruki Seto, Aichi (JP); Kakunari Takeda, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 108 days.

(21) Appl. No.: 18/196,484

(22) Filed: May 12, 2023

(65) Prior Publication Data

US 2023/0366460 A1    Nov. 16, 2023

(30) Foreign Application Priority Data

May 16, 2022    (JP) .................................. 2022-080288

(51) Int. Cl.
*F16H 59/10* (2006.01)
(52) U.S. Cl.
CPC .................. *F16H 59/105* (2013.01)
(58) Field of Classification Search
CPC .... F16H 59/105; F16H 59/0217; F16H 59/12; F16H 63/40; F16H 2063/423; F16H 61/12; F16H 61/18; F16H 2059/081
USPC .................... 200/61.88, 61.91, 517
See application file for complete search history.

(56) References Cited

U.S. PATENT DOCUMENTS

| | | | | |
|---|---|---|---|---|
| 5,584,209 | A * | 12/1996 | Issa | F16H 59/0204 74/335 |
| 9,845,868 | B2 * | 12/2017 | Lee | F16H 63/42 |
| 10,830,339 | B2 * | 11/2020 | Watanabe | F16H 61/22 |
| 11,009,120 | B2 * | 5/2021 | Kameyama | F16H 59/0208 |
| 11,131,381 | B2 * | 9/2021 | Morimura | F16H 61/24 |
| 2019/0383386 | A1 * | 12/2019 | Harris | F16H 59/08 |
| 2021/0317911 | A1 * | 10/2021 | Cho | F16H 61/0204 |

FOREIGN PATENT DOCUMENTS

| | | | | |
|---|---|---|---|---|
| EP | 102006038466 | * | 4/2007 | ............. F16H 59/10 |
| JP | H07-52675 | A | 2/1995 | |
| JP | 2003-072486 | A | 3/2003 | |
| JP | 2004-301655 | A | 10/2004 | |
| JP | 2012-216113 | A | 11/2012 | |
| JP | 2013203286 | A | 10/2013 | |
| JP | 3231189 | U | 3/2021 | |

OTHER PUBLICATIONS

Translation of DE102006038466(Original document published Apr. 12, 2007) (Year: 2007).*

* cited by examiner

*Primary Examiner* — William A Bolton
(74) *Attorney, Agent, or Firm* — Studebaker Brackett PLLC

(57) ABSTRACT

A shift device including: a shift body that, when operated, is configured to change a shift position; a first switch that, when operated, is configured to control a drivetrain system of a vehicle; and a second switch that, when operated, is configured to control a non-drivetrain system of a vehicle, the second switch having a different operating aspect from the first switch.

7 Claims, 10 Drawing Sheets

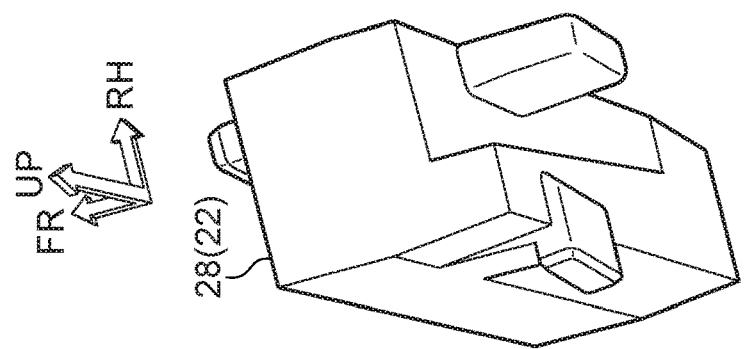
FIG.5A  FIG.5B  FIG.5C
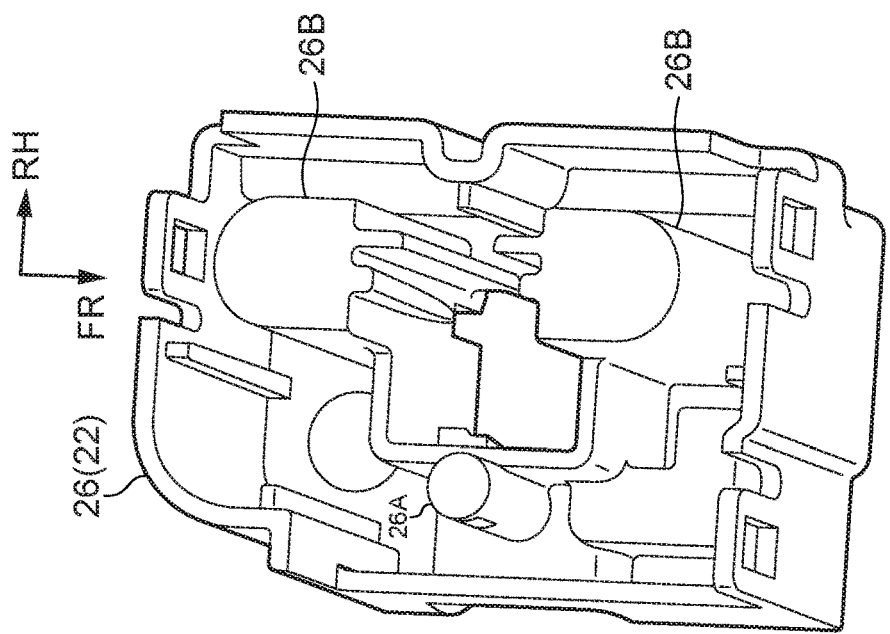
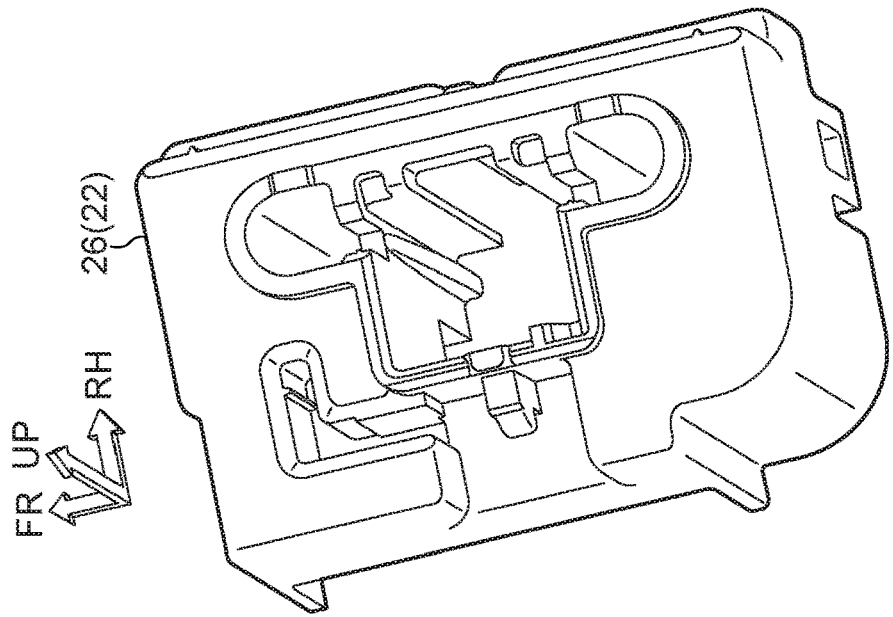

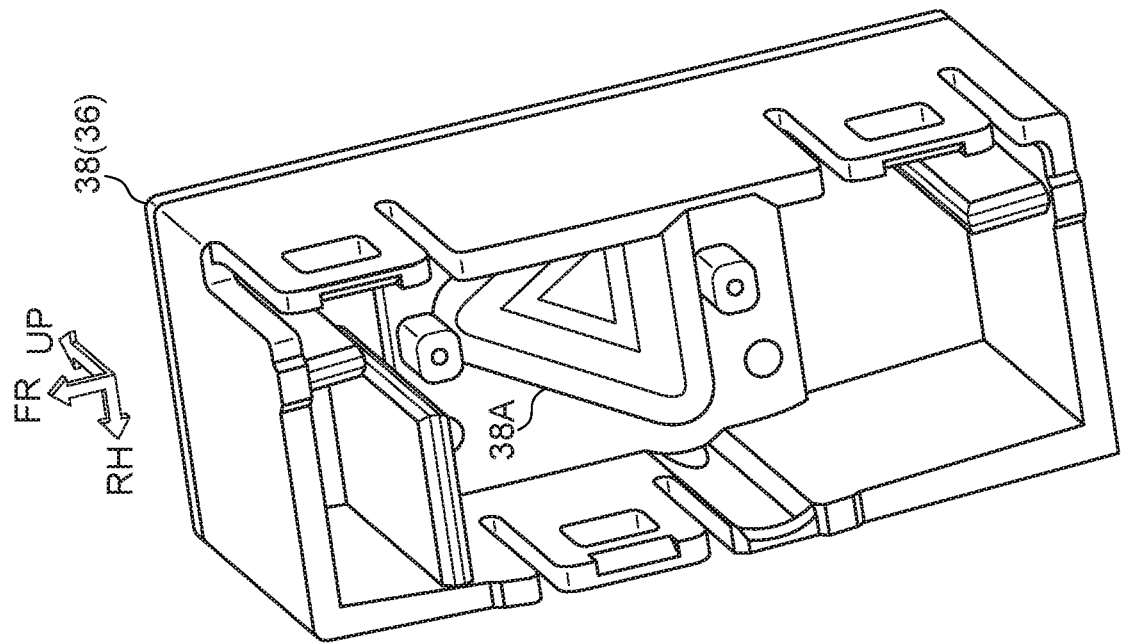
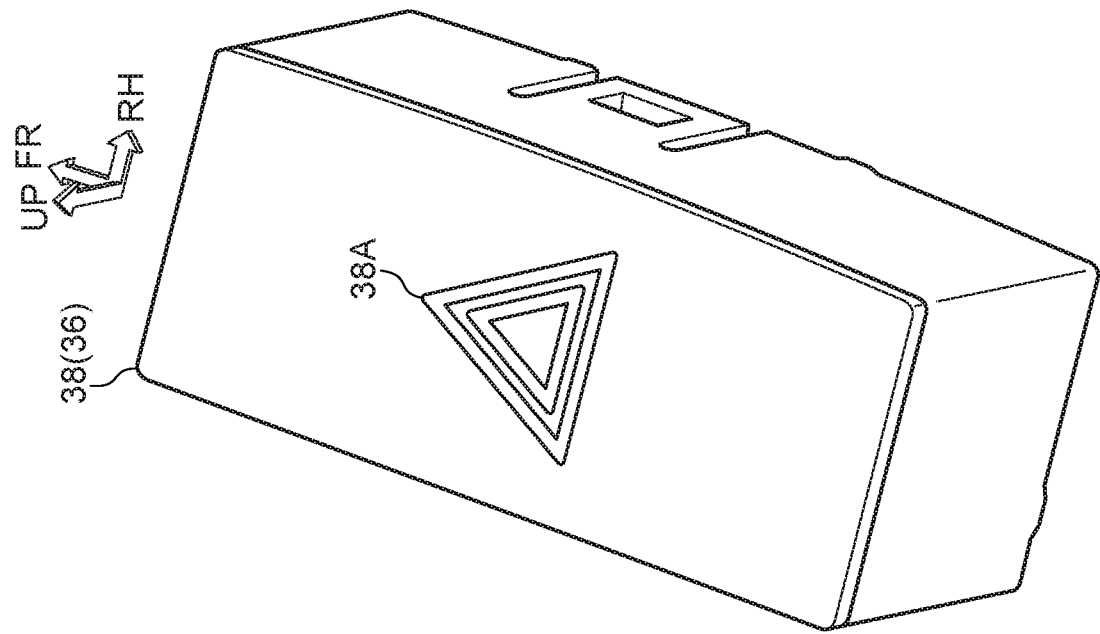

SHIFT DEVICE

CROSS-REFERENCE TO RELATED APPLICATION

This application is based on and claims priority under 35 USC 119 from Japanese Patent Application No. 2022-80288 filed on May 16, 2022, the disclosure of which is incorporated by reference herein.

BACKGROUND

Technical Field

The present disclosure relates to a shift device where a shift position is changed as a result of a shift body being operated.

Related Art

Japanese Patent Application Laid-open (JP-A) No. 2013-203286 discloses a shift device where the position of a drive lever is changed as a result of the drive lever being swung.

Here, the shift device is provided with a P knob and an N switch, and the drivetrain system of the vehicle is controlled as a result of the P knob or the N switch being operated.

SUMMARY

In consideration of the above circumstances, it is an object of the present disclosure to obtain a shift device whose physical size can be reduced.

A shift device of a first aspect of the present disclosure includes: a shift body that, when operated, is configured to change a shift position; a first switch that, when operated, is configured to control a drivetrain system of a vehicle; and a second switch that, when operated, is configured to control a non-drivetrain system of a vehicle, the second switch having a different operating aspect from the first switch.

In the shift device of the first aspect of the present disclosure, the shift position is changed as a result of the shift body being operated. Furthermore, the first switch and the second switch have different operating aspects, the drivetrain system of the vehicle is controlled as a result of the first switch being operated, and the non-drivetrain system of the vehicle is controlled as a result of the second switch being operated.

Here, the shift device is provided with the second switch in addition to the shift body and the first switch. For this reason, compared with a case where the second switch is provided separately from the shift device, physical size can be reduced.

A shift device of a second aspect of the present disclosure is the shift device of the first aspect of the present disclosure, wherein the first switch and the second switch have, as operating aspects, different operating sounds.

In the shift device of the second aspect of the present disclosure, the first switch and the second switch have as operating aspects different operating sounds. For this reason, mistaken operation of the first switch and the second switch can be inhibited.

A shift device of a third aspect of the present disclosure is the shift device of the first aspect or the second aspect of the present disclosure, wherein the first switch and the second switch have, as operating aspects, different operating loads.

In the shift device of the third aspect of the present disclosure, the first switch and the second switch have as operating aspects different operating loads. For this reason, mistaken operation of the first switch and the second switch can be inhibited.

A shift device of a fourth aspect of the present disclosure is the shift device of any one of the first aspect to the third aspect of the present disclosure, wherein the first switch and the second switch have, as operating aspects, different operating strokes.

In the shift device of the fourth aspect of the present disclosure, the first switch and the second switch have as operating aspects different operating strokes. For this reason, mistaken operation of the first switch and the second switch can be inhibited.

A shift device of a fifth aspect of the present disclosure is the shift device of any one of the first aspect to the fourth aspect of the present disclosure, wherein the first switch is provided with a tact switch.

In the shift device of the fifth aspect of the present disclosure, the first switch is provided with the tact switch. For this reason, the operating sound of the first switch can be made louder.

BRIEF DESCRIPTION OF THE DRAWINGS

An exemplary embodiment of the present disclosure will be described in detail based on the following figures, wherein:

FIG. 5A is a perspective view of the P holder of the P switch of the shift device pertaining to the embodiment of the present disclosure as seen obliquely from above and the rear;

FIG. 5B is a perspective view of the P holder of the P switch of the shift device pertaining to the embodiment of the present disclosure as seen obliquely from below and the front;

FIG. 5C is a perspective view of a P lightguide of the P switch of the shift device pertaining to the embodiment of the present disclosure as seen obliquely from above and the rear;

FIG. 7A is a perspective view of a hazard operation frame of the hazard switch of the shift device pertaining to the present disclosure of the present disclosure as seen obliquely from above and the rear;

FIG. 7B is a perspective view of the hazard operation frame of the hazard switch of the shift device pertaining to the embodiment of the present disclosure as seen obliquely from below and the front;

DETAILED DESCRIPTION

Figure 1A:
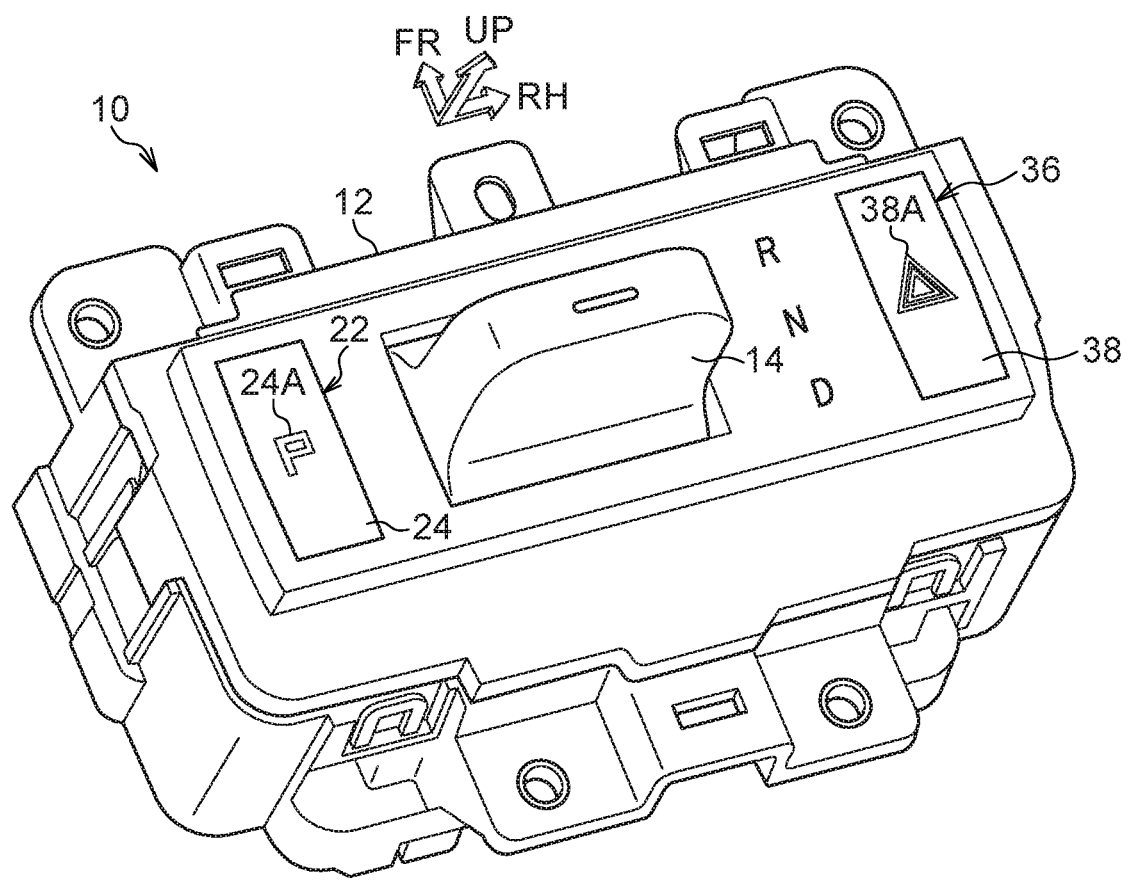
FIG. 1A is a perspective view of a shift device pertaining to the embodiment of the present disclosure as seen obliquely from the left and rear.
Figure 1B:
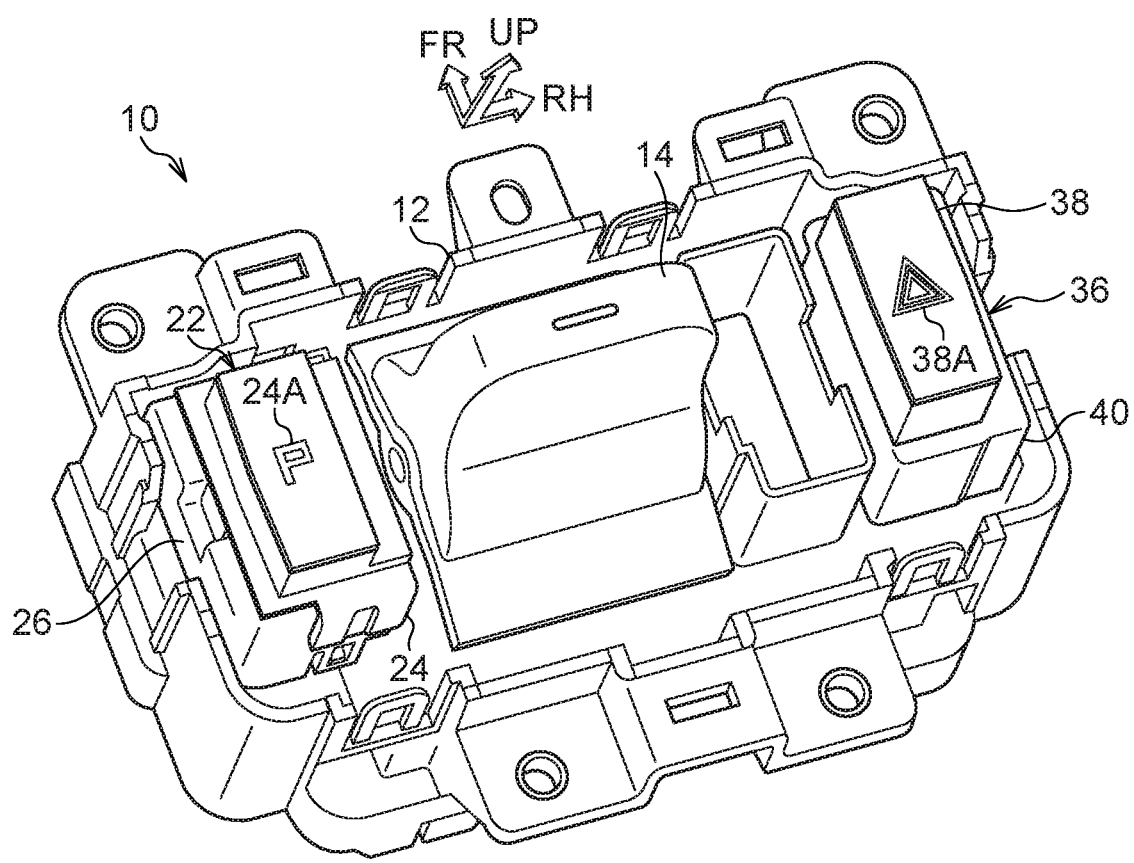
FIG. 1B is a perspective view of the inside of the shift device pertaining to the embodiment of the present disclosure as seen obliquely from the left and rear.

In FIG. 1A a shift device 10 pertaining to an embodiment of the present disclosure is shown in a perspective view as seen obliquely from the left and rear, and in FIG. 1B the inside of the shift device 10 is shown in a perspective view as seen obliquely from the left and rear. It will be noted that, in the drawings, arrow FR indicates a forward direction of the shift device 10, arrow RH indicates a rightward direction of the shift device 10, and arrow UP indicates an upward direction of the shift device 10.

The shift device 10 pertaining to the present embodiment is installed in a console (not shown in the drawings) of a vehicle (an automobile), and the forward direction, the rightward direction, and the upward direction of the shift device 10 are aligned with the forward direction, the rightward direction, and the upward direction, respectively, of the vehicle.

As shown in FIG. 1A and FIG. 1B, the shift device 10 is provided with a plate 12 substantially in the shape of a cuboidal box and serving as an installation body. The plate 12 is secured inside the console (not shown in the drawings), and its upper wall is exposed through the console to the cabin.

In the left and right direction middle portion in the plate 12 is provided a lever 14 substantially in the shape of a triangular prism and serving as a shift body, and the lower portion of the lever 14 is enlarged in the front and rear direction. The lever 14 is supported at its lower portion so as to be pivotable in the front and rear direction in the plate 12, and the lever 14 pivotally runs through the upper wall of the plate 12. The lever 14 is pivotally operable at its upper portion by an occupant (particularly a driver) of the vehicle, and when the lever 14 is pivoted, the shift position of the lever 14 is changed to a reverse (R) position, a neutral (N) position, and a drive (D) position.

Figure 3:
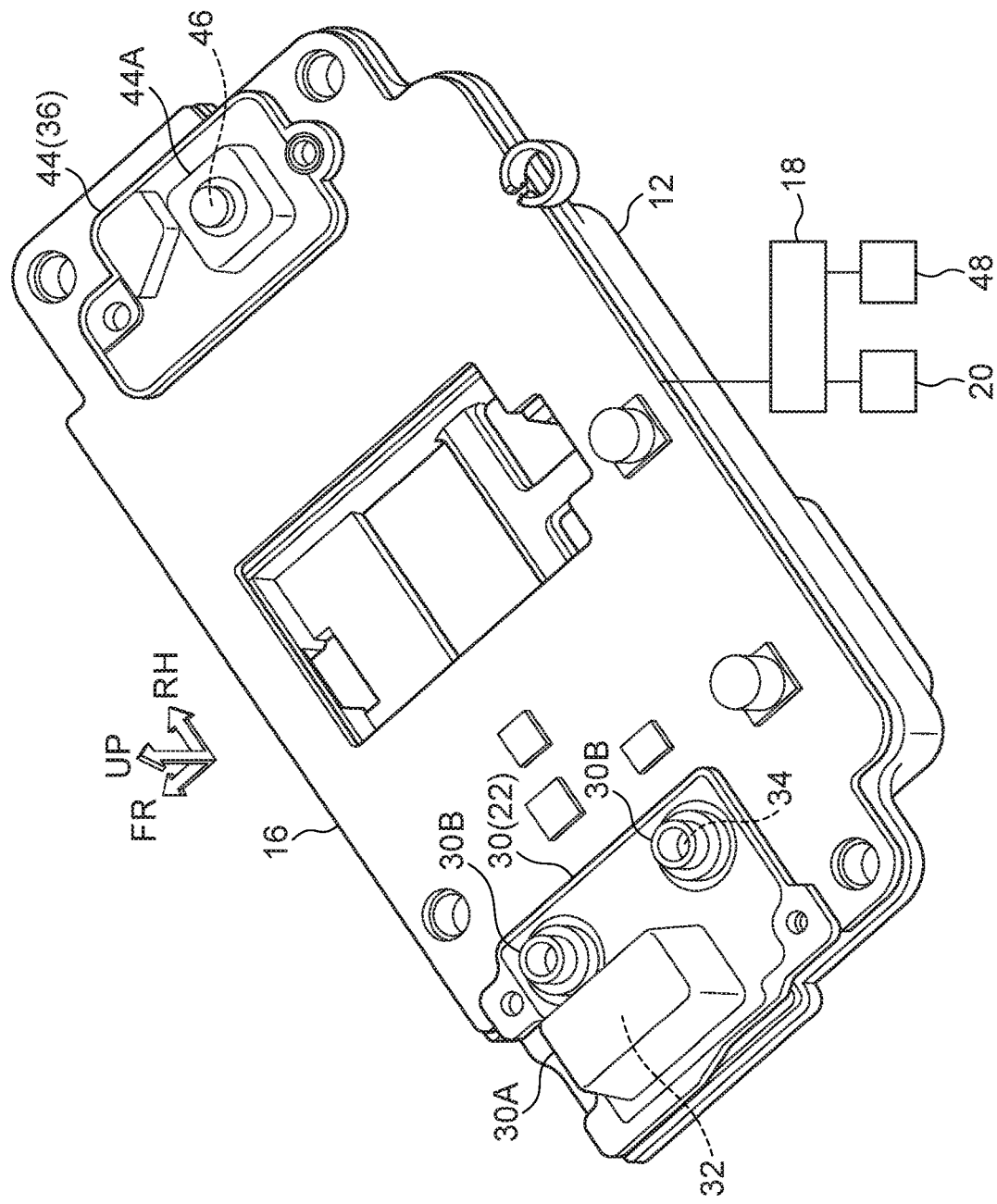
FIG. 3 is a perspective view of a circuit board and other parts of the shift device pertaining to the embodiment of the present disclosure as seen obliquely from the left and rear.

To the lower portion in the plate 12 is secured a circuit board 16 (see FIG. 3) substantially in the shape of a rectangular plate and serving as a detection device, and the circuit board 16 is disposed perpendicular to the up and down direction. The circuit board 16 can detect the shift position of the lever 14 by detecting the pivot position of the lever 14. The circuit board 16 is electrically connected to a control device 18 of the vehicle, and to the control device 18 is electrically connected a transmission 20 (an automatic transmission) of the vehicle.

In the left portion of the plate 12 is provided a P switch 22 serving as a first switch.

Figure 4B:
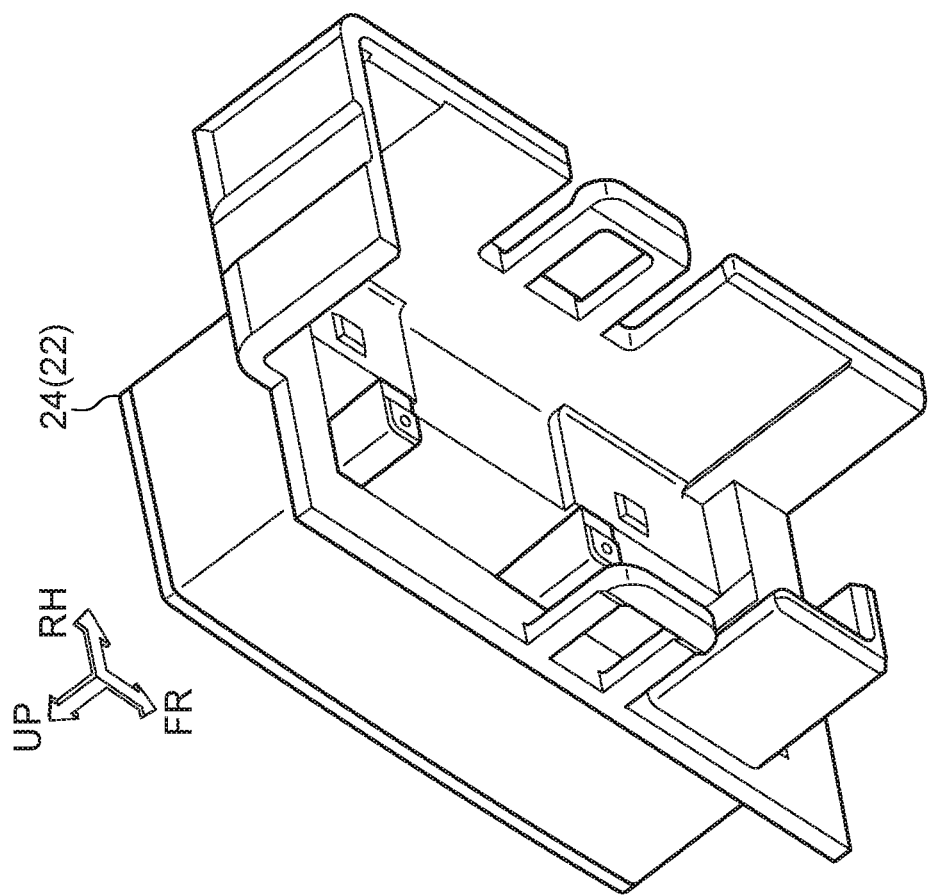
FIG. 4B is a perspective view of the P operation frame of the P switch of the shift device pertaining to the embodiment of the present disclosure as seen obliquely from below and the left.
Figure 4A:
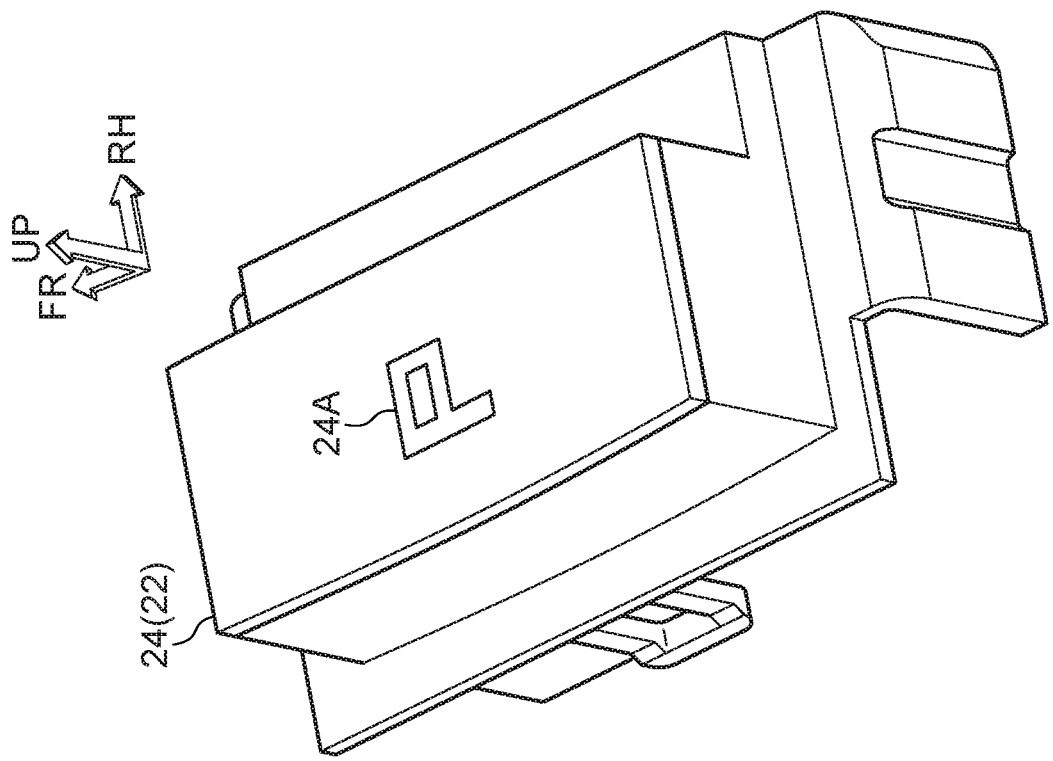
FIG. 4A is a perspective view of a P operation frame of the P switch of the shift device pertaining to the embodiment of the present disclosure as seen obliquely from above and the rear.

In the upper portion of the P switch 22 is provided a P operation frame 24 (see FIG. 4A and FIG. 4B) in the shape of a bottomed rectangular tube and serving as an operation portion, and the inside of the P operation frame 24 opens downward. The P operation frame 24 runs through the upper wall of the plate 12, and its upper wall is exposed above through the plate 12. The upper wall of the P operation frame 24 is pressingly operable downward by the occupant. In the upper wall of the P operation frame 24 is provided a P indicator 24A that is the letter P, and the upper wall of the P operation frame 24 can transmit light at the P indicator 24A portion.

Figure 2A:
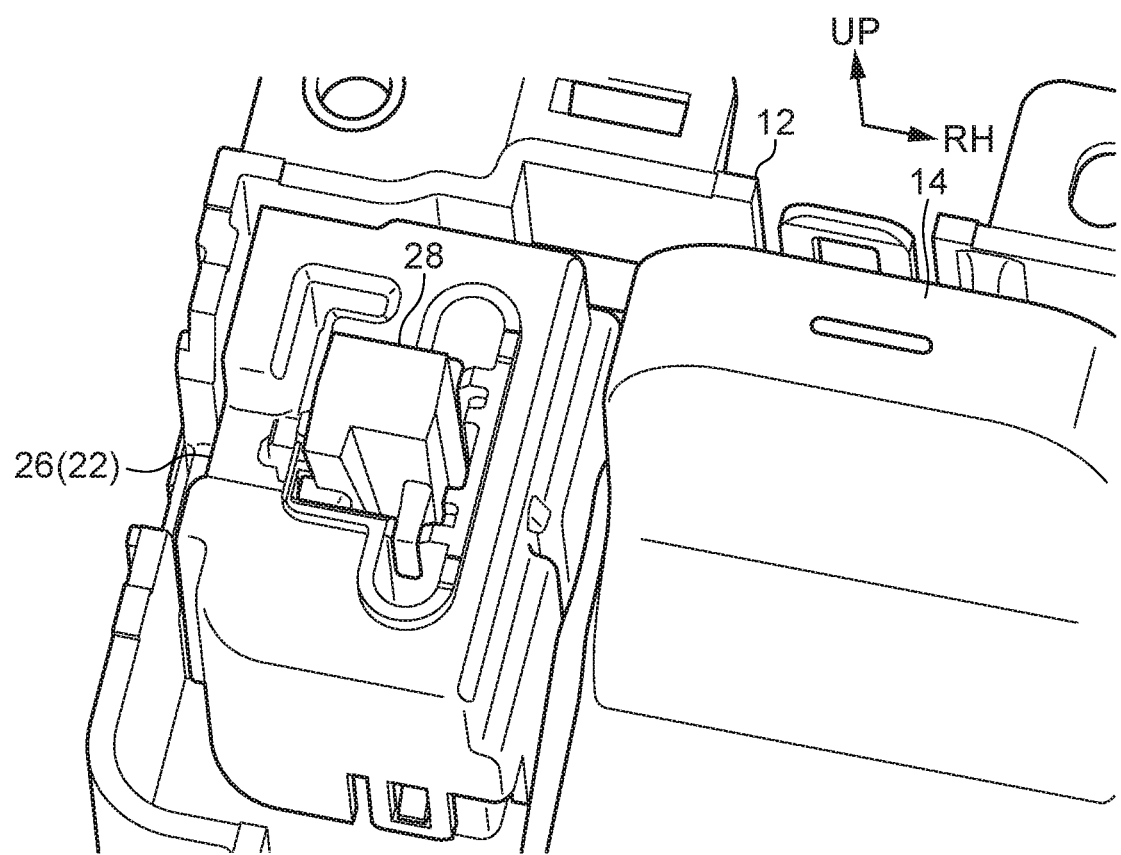
FIG. 2A is a perspective view of a P holder of a P switch and other parts of the shift device pertaining to the embodiment of the present disclosure as seen obliquely from the right and rear.

To the lower side of the P operation frame 24 is secured a P holder 26 (see FIG. 2A, FIG. 5A, and FIG. 5B) in the shape of a bottomed rectangular tube and serving as a moving portion. The inside of the P holder 26 opens downward, and the P holder 26 is supported so as to be movable in the up and down direction in a predetermined range in the plate 12. On the left portion of the upper wall of the P holder 26, a left column 26A substantially in the shape of a cylinder and serving as a moving site is integrally provided, and the left column 26A extends downward. On the front portion and the rear portion of the right portion of the upper wall of the P holder 26, right columns 26B substantially in the shape of bottomed semicircular tubes and serving as moving sites are integrally provided. The right columns 26B extend downward, and their insides open upward.

A transparent P lightguide 28 (see FIG. 5C) substantially in the shape of a rectangular column runs through and is secured to the central portion of the upper wall of the P holder 26, and the P indicator 24A of the P operation frame 24 is disposed on the upper side of the P lightguide 28. The circuit board 16 is disposed on the lower side of the P lightguide 28, and a P-use LED (not shown in the drawings) is provided on the circuit board 16 on the lower side of the P lightguide 28. The P-use LED is electrically connected via the circuit board 16 to the control device 18, and when the P-use LED emits light under the control of the control device 18, the P lightguide 28 guides the light to the P indicator 24A and the P indicator 24A becomes illuminated and indicated.

Figure 2B:
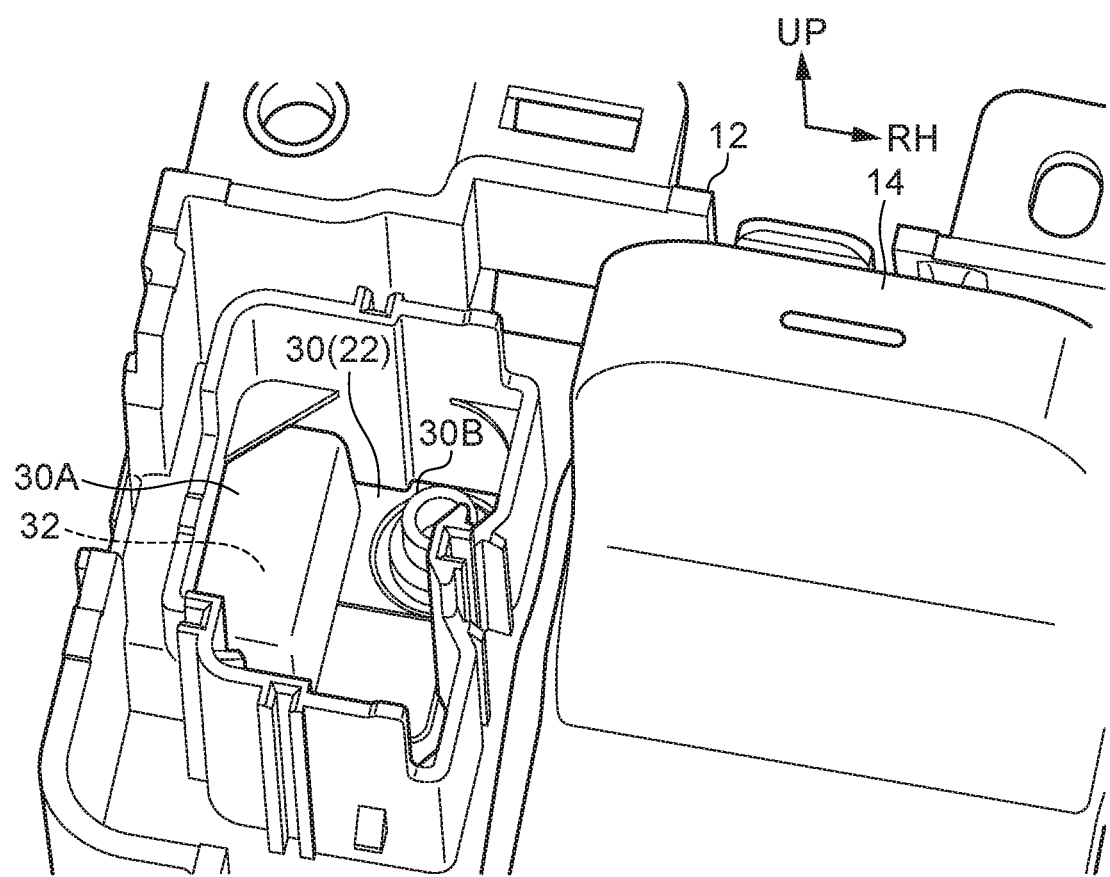
FIG. 2B is a perspective view of a P cover plate of the P switch and other parts of the shift device pertaining to the embodiment of the present disclosure as seen obliquely from the right and rear.

On the lower side of the P holder 26 is provided a P cover plate 30 (see FIG. 2B and FIG. 3A) substantially in the shape of a rectangular plate and serving as a cover member. The P cover plate 30 is secured to the circuit board 16, is made of rubber, and is elastic. In the left portion of the P cover plate 30, a P dome 30A in the shape of a cuboidal box and serving as a deformation portion is integrally formed, and the inside of the P dome 30A opens downward. The left column 26A of the P holder 26 is in abutting contact with the upper side of the P dome 30A, and the P dome 30A limits downward movement of the P holder 26 and the P operation frame 24. In the front portion and the rear portion of the right portion of the P cover plate 30, tube portions 30B substantially in the shape of bottomed circular tubes and serving as deformation portions are integrally formed, and the insides of the tube portions 30B open upward. The lower walls (bottom walls) of the tube portions 30B are upwardly spaced apart from the circuit board 16, and the right columns 26B of the P holder 26 are disposed on the upper sides of the tube portions 30B.

Inside the P dome 30A of the P cover plate 30 is provided a tact switch 32 that configures a switch mechanism, and the tact switch 32 is installed on the circuit board 16 and is electrically connected via the circuit board 16 to the control device 18. On the lower side of the tube portion 30B located on the rear side (may also be the front side) of the P cover plate 30 is provided a P contact switch 34 that configures a switch mechanism, and the P contact switch 34 is installed on the circuit board 16 and is electrically connected via the circuit board 16 to the control device 18.

Figure 6:
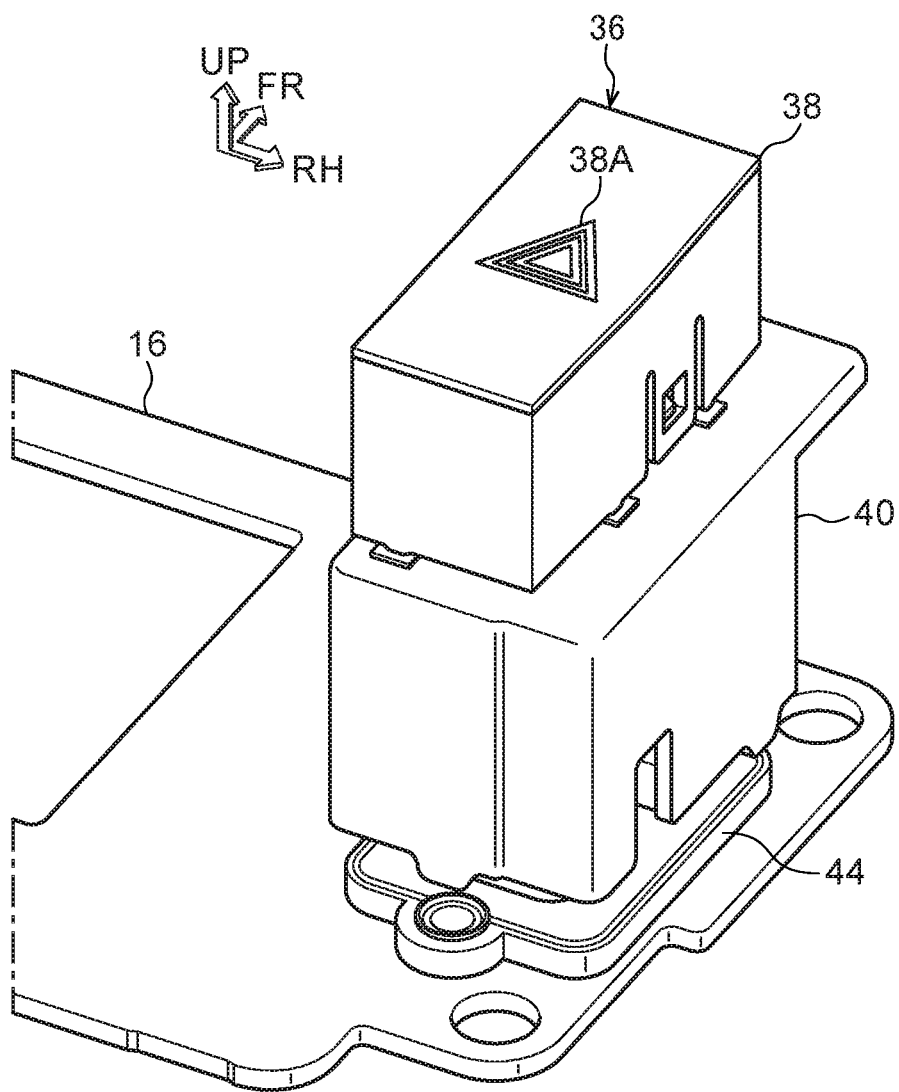
FIG. 6 is a perspective view of a hazard switch of the shift device pertaining to the embodiment of the present disclosure as seen obliquely from the right and rear.

In the right portion of the plate 12 is provided a hazard switch 36 (see FIG. 6) serving as a second switch.

In the upper portion of the hazard switch 36 is provided a hazard operation frame 38 (see FIG. 7A and FIG. 7B) in the shape of a bottomed rectangular tube and serving as an operation portion, and the inside of the hazard operation frame 38 opens downward. The hazard operation frame 38 runs through the upper wall of the plate 12, and its upper wall is exposed above through the plate 12. The upper wall of the hazard operation frame 38 is pressingly operable downward by the occupant. In the upper wall of the hazard operation frame 38 is provided a hazard indicator 38A that is a hazard mark, and the upper wall of the hazard operation frame 38 can transmit light at the hazard indicator 38A portion.

Figure 8C:
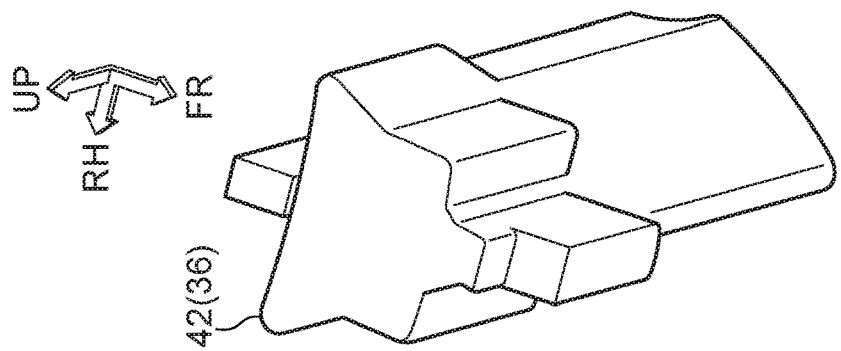
FIG. 8C is a perspective view showing a hazard lightguide of the hazard switch of the shift device pertaining to the embodiment of the present disclosure as seen obliquely from above and the front.
Figure 8B:
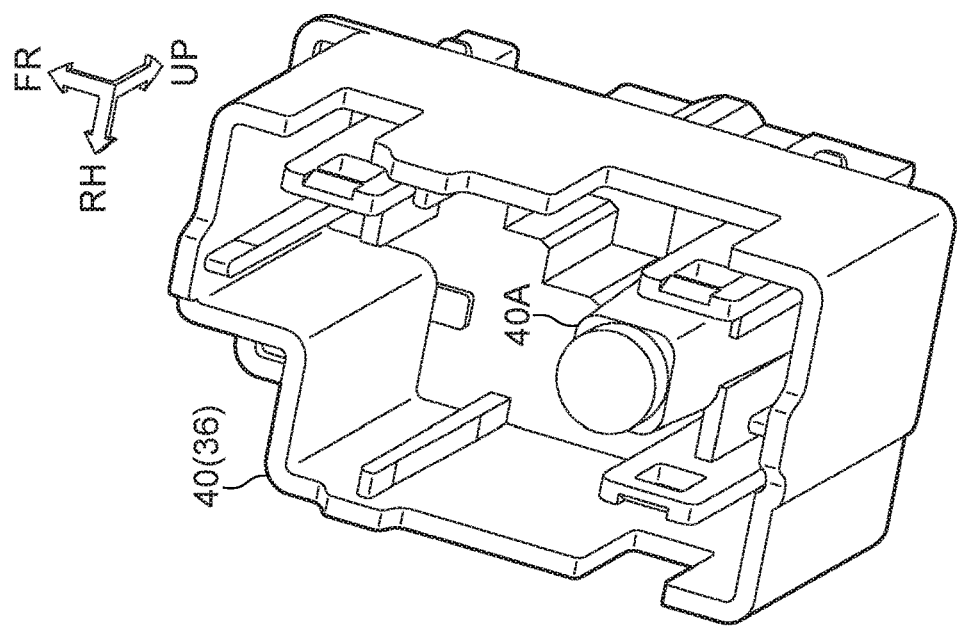
FIG. 8B is a perspective view of the hazard holder of the hazard switch of the shift device pertaining to the embodiment of the present disclosure as seen obliquely from below and the rear.
Figure 8A:
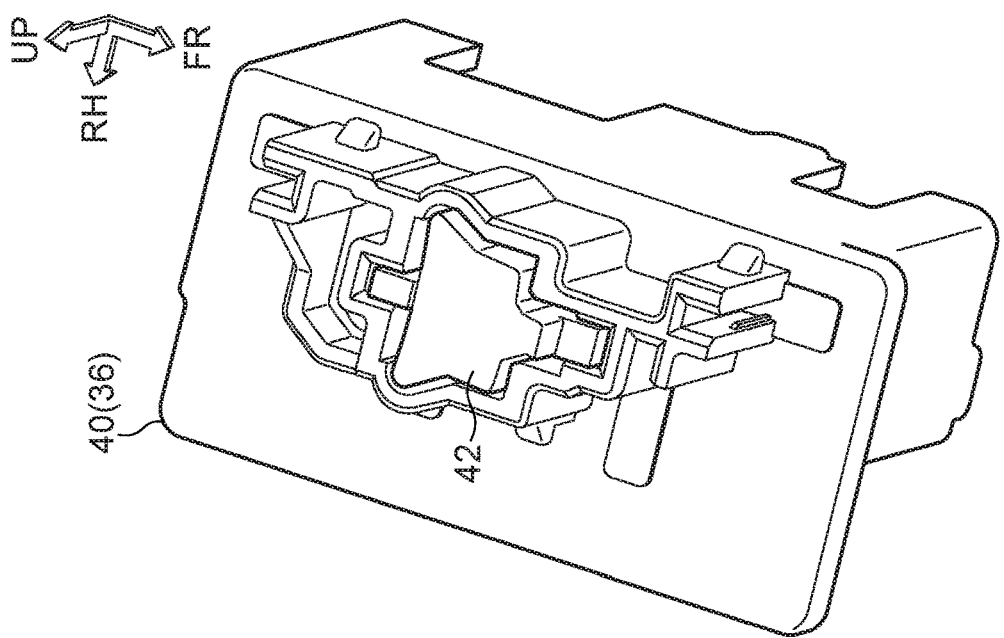
FIG. 8A is a perspective view of a hazard holder of the hazard switch of the shift device pertaining to the embodiment of the present disclosure as seen obliquely from above and the front.

To the lower side of the hazard operation frame 38 is secured a hazard holder 40 (see FIG. 8A and FIG. 8B) in the shape of a bottomed rectangular tube and serving as a moving portion. The inside of the hazard holder 40 opens downward, and the hazard holder 40 is supported so as to be movable in the up and down direction in a predetermined range in the plate 12. On the rear portion of the upper wall of the hazard holder 40, a moving column 40A substantially in the shape of a cylinder and serving as a moving site is integrally provided, and the moving column 40A extends downward.

A transparent hazard lightguide 42 (see FIG. 8C) substantially in the shape of a triangular prism runs through and is secured to the central portion of the upper wall of the hazard holder 40, and the hazard indicator 38A of the hazard operation frame 38 is disposed on the upper side of the hazard lightguide 42. The circuit board 16 is disposed on the lower side of the hazard lightguide 42, and a hazard-use LED (not shown in the drawings) is provided on the circuit board 16 on the lower side of the hazard lightguide 42. The hazard-use LED is electrically connected via the circuit board 16 to the control device 18, and when the hazard-use LED emits light under the control of the control device 18, the hazard lightguide 42 guides the light to the hazard indicator 38A and the hazard indicator 38A becomes illuminated and indicated.

On the lower side of the hazard holder 40 is provided a hazard cover plate 44 (see FIG. 3) substantially in the shape of a rectangular plate and serving as a cover member. The hazard cover plate 44 is secured to the circuit board 16, is made of rubber, and is elastic. In the rear portion of the hazard cover plate 44, a hazard dome 44A in the shape of a cuboidal box and serving as a deformation portion is integrally formed, and the inside of the hazard dome 44A opens downward. The moving column 40A of the hazard holder 40 is in abutting contact with the upper side of the hazard dome 44A, and the hazard dome 44A limits downward movement of the hazard holder 40 and the hazard operation frame 38.

On the lower side of the hazard dome 44A of the hazard cover plate 44 is provided a hazard contact switch 46 serving as a switch mechanism, and the hazard contact switch 46 is installed on the circuit board 16 and is electrically connected via the circuit board 16 to the control device 18. Also electrically connected to the control device 18 are hazard lamps 48 of the vehicle.

Next, the action of the present embodiment will be described.

In the shift device 10 of the above configuration, when the circuit board 16 detects that the shift position of the lever 14 has been changed to the R position, the N position, and the D position as a result of the lever 14 being pivotally operated in the front and rear direction, the shift range of the transmission 20 is changed to the reverse (R) range, the neutral (N) range, and the drive (D) range by the control of the control device 18.

Moreover, when the P switch 22 (the upper wall of the P operation frame 24) is pressingly operated downward, the P operation frame 24 and the P holder 26 are moved downward. For this reason, the P dome 30A of the P cover plate 30 becomes elastically deformed downward by the left column 26A of the P holder 26 so that the tact switch 32 is switched ON, and the tube portions 30B of the P cover plate 30 become elastically deformed downward by the right columns 26B of the P holder 26 so that the P contact switch 34 is switched ON. Because of this, when the P switch 22 is switched ON, the shift range of the transmission 20 is changed to a park (P) range by the control of the control device 18.

Furthermore, when the hazard switch 36 (the upper wall of the hazard operation frame 38) is pressingly operated downward, the hazard operation frame 38 and the hazard holder 40 are moved downward. For this reason, the hazard dome 44A of the hazard cover plate 44 becomes elastically deformed downward by the moving column 40A of the hazard holder 40, and the hazard contact switch 46 is switched ON. Because of this, when the hazard switch 36 is switched ON, the hazard lamps 48 are lighted (flashed on and off) by the control of the control device 18.

Here, the shift device 10 is provided with the hazard switch 36 in addition to the lever 14 and the P switch 22. For this reason, in contrast to a case where the hazard switch 36 is provided separately from the shift device 10, the configuration of the shift device 10 can be used to configure the hazard switch 36, and the physical size of the shift device 10 and the hazard switch 36 overall can be reduced. Moreover, in a case where the shift range of the transmission 20 is changed to a shift range unintended by the user (e.g., in a case where, when the speed of the vehicle is equal to or higher than a predetermined speed, the transmission 20 is changed to the N range by the control of the control device 18 even though the occupant has pivotally operated the lever 14 to the R position or the D position), the occupant can easily press the hazard switch 36 and can cause the hazard lamps 48 to flash on and off.

Furthermore, the P switch 22 is provided with the tact switch 32, and when the P switch 22 is switched ON, the tact switch 32 is switched ON and a click sound is produced, so the operating sound of the P switch 22 is loud. By contrast, when the hazard switch 36 is switched ON, only the hazard contact switch 46 is switched ON, so the operating sound of the hazard switch 36 is quiet. For this reason, the operating sound of the P switch 22 and the operating sound of the hazard switch 36 are different from each other, so mistaken operation of the P switch 22 and the hazard switch 36 can be inhibited because the occupant perceives the difference between the operating sounds of the P switch 22 and the hazard switch 36.

Moreover, the operating load for the P switch 22 to be switched ON is large because it is the sum of the load for the P dome 30A and the pair of tube portions 30B of the P cover plate 30 to be elastically deformed and the load for the P switch 22 to be switched ON. By contrast, the operating load for the hazard switch 36 to be switched ON is small because it is the load for the hazard dome 44A of the hazard cover plate 44 to be elastically deformed. For this reason, the operating load of the P switch 22 and the operating load of the hazard switch 36 are different from each other, so mistaken operation of the P switch 22 and the hazard switch 36 can be inhibited because the occupant perceives the difference in the operating loads of the P switch 22 and the hazard switch 36.

Moreover, the operating stroke for the P switch 22 to be switched ON is larger than the operating stroke for the hazard switch 36 to be switched ON. For this reason, the operating stroke of the P switch 22 and the operating stroke of the hazard switch 36 are different from each other, so mistaken operation of the P switch 22 and the hazard switch 36 can be inhibited because the occupant perceive the differences in the operating strokes of the P switch 22 and the hazard switch 36.

In the present embodiment, the first switch is the P switch 22, so the shift range of the transmission 20 is changed to the P range as a result of the P switch 22 being operated. However, the first switch need only be a switch that controls the drivetrain system (the power transmission mechanism between the drive source and the drive wheels) of the vehicle. For example, the first switch may be a manual (M) switch or a sequential (S) switch, and the shift range of the transmission 20 is changed to a manual (M) range or a sequential (S) range as a result of the M switch or the S switch being operated.

Moreover, in the present embodiment, the second switch is the hazard switch 36, so the hazard lamps 48 are controlled as a result of the hazard switch 36 being operated. However, the second switch need only be a switch that controls a non-drivetrain system of the vehicle. For example, the ON/OFF of an electronic parking brake (EPB), the ON/OFF of an engine, driving modes of the vehicle, audio, an air conditioner, or a car navigation system may be controlled as a result of the second switch being operated.

Furthermore, in the present embodiment, the shift device 10 is installed in the console of the vehicle. However, the shift device 10 may also be installed in another part (e.g., an instrument panel or a steering column) of the vehicle.

What is claimed is:

1. A shift device comprising:
   a shift body that, when operated, is configured to change a shift position;
   a first switch that, when operated, is configured to control a drivetrain system of a vehicle; and
   a second switch that, when operated, is configured to control a non-drivetrain system of the vehicle, the second switch having a different operating sound from the first switch,
   wherein the difference in operating sound allows a user to distinguish between the first switch and the second switch.

2. The shift device of claim 1, wherein the operating sound of the first switch is louder than the operating sound of the second switch.

3. The shift device of claim 1, wherein the first switch is provided with a tact switch.

4. A shift device comprising:
   a shift body that, when operated, is configured to change a shift position;
   a first switch that, when operated, is configured to control a drivetrain system of a vehicle; and
   a second switch that, when operated, is configured to control a non-drivetrain system of the vehicle, the second switch having a different operating load from the first switch,
   wherein the difference in operating load allows a user to distinguish between the first switch and the second switch.

5. The shift device of claim 4, wherein the operating load of the first switch is larger than the operating load of the second switch.

6. A shift device comprising:
   a shift body that, when operated, is configured to change a shift position;
   a first switch that, when operated, is configured to control a drivetrain system of a vehicle; and
   a second switch that, when operated, is configured to control a non-drivetrain system of the vehicle, the second switch having a different operating stroke from the first switch,
   wherein the difference in operating stroke allows a user to distinguish between the first switch and the second switch.

7. The shift device of claim 6, wherein the operating stroke of the first switch is larger than the operating stroke of the second switch.

* * * * *